(12) United States Patent
Herrington

(10) Patent No.: US 8,372,171 B2
(45) Date of Patent: Feb. 12, 2013

(54) CO GENERATOR AND PROCESS FOR DESULFURIZING SOLID CARBON-BASED FUELS

(76) Inventor: Louis Herrington, Daphne, AL (US)

( * ) Notice: Subject to any disclaimer, the term of this patent is extended or adjusted under 35 U.S.C. 154(b) by 522 days.

(21) Appl. No.: 12/624,007

(22) Filed: Nov. 23, 2009

(65) Prior Publication Data

US 2011/0119998 A1    May 26, 2011

(51) Int. Cl.
*C01B 6/24* (2006.01)
*C01B 3/02* (2006.01)
*C01B 3/36* (2006.01)
*B01J 7/00* (2006.01)
*C10J 3/00* (2006.01)

(52) U.S. Cl. .............................. 48/197 R; 48/61; 48/210
(58) Field of Classification Search ................ 423/418.2
See application file for complete search history.

(56) References Cited

U.S. PATENT DOCUMENTS

| | | | | |
|---|---|---|---|---|
| 3,046,093 A * | 7/1962 | Alexander | ................. | 423/415.1 |
| 3,175,890 A * | 3/1965 | Textor | ............................ | 422/233 |
| 3,325,253 A * | 6/1967 | Schmidt | .................... | 423/418.2 |
| 3,635,672 A * | 1/1972 | Johnson | ..................... | 423/418.2 |
| 4,180,387 A * | 12/1979 | Rudolph | ........................ | 48/206 |
| 4,564,513 A * | 1/1986 | Becher et al. | ............. | 423/418.2 |
| 7,473,286 B2 * | 1/2009 | Blaschke et al. | ................. | 48/61 |

* cited by examiner

*Primary Examiner* — Matthew Merkling

(57) ABSTRACT

A process is presented whereby hot Carbon Monoxide (CO) gas is generated under pressure in an external Combustor by the partial oxidation of a carbon-based solid fuel. This pressurized, hot CO gas or CO gas mixture is then transferred to a desulfurizing vessel containing a second carbon-based solid fuel. The hot CO laden gas and solid material contact in a counter-flow arrangement where the CO reacts with and removes sulfur impurities from the second carbon fuel. The temperature of the pressurized CO laden gas from the Combustor is controlled by varying the oxidizer feed gas composition. The Combustor also contains a means for desulfurizing its feed fuel by flowing a portion of the hot CO gas generated up through the inlet solid fuel feed line.

19 Claims, 3 Drawing Sheets

CO GENERATOR AND PROCESS FOR DESULFURIZING SOLID CARBON-BASED FUELS

CROSS REFERENCE TO RELATED APPLICATIONS

This application claims the benefit under 35 U.S.C. 119(e) of provisional application U.S. 61/115,384

STATEMENT REGARDING FEDERALLY SPONSORED RESEARCH OR DEVELOPMENT

N/A

BACKGROUND OF THE INVENTION

1. Field of the Invention

The present invention relates to processes that remove sulfur and nitrogen impurities from carbon-based solid fuels such as calcined petroleum coke or coal. More particularly, this invention relates to the desulfurization of calcined delayed petroleum coke by controlled contact with Carbon Monoxide (CO) gas at elevated temperatures to produce a high-grade coke suitable for metallurgical and chemical applications. Raw coke produced from Delayed coke processes typically contains high levels of sulfur and nitrogen impurities. These impurities are both chemically and physically embedded within the carbon, which renders them unsuitable for many important commercial uses. However, the relatively low cost and abundance of raw petroleum coke as a byproduct of crude oil refining has created much demand for processes that can economically remove these impurities. The demand for newer, more efficient coke desulfurizing processes is becoming even more imperative as crude oil sulfur levels have been increasing over the years. Additionally, processes for desulfurizing coal have also become imperative as more stringent pollution regulations are placed on coal-fired power plants.

High-value coke, such as that used for making anodes for aluminum production and electrodes for ferrous metallurgy are predominantly made from calcined Delayed coke. Delayed coke is obtained by heating liquid crude oil residuum to around 480° C.-500° C. and holding the material in a large insulated vessel for several hours. During this holding time, the tarry hydrocarbon molecules crack into lighter gaseous fractions. As the remaining mixture cools, it solidifies into a material called Delayed coke, which contains mostly elemental carbon, some very large hydrocarbon molecules (volatile matter), minerals, and various other inorganic impurities. The crystalline structure of the carbon is dependent on the type of coking process used to create it. The most abundant type, "sponge coke," is a porous, crystalline material that, after calcining to remove the volatile matter and to refine the structure, is a suitable ingredient for typical carbon products, such as carbon and stainless steels. A second common form is called "needle coke." Needle coke is even more crystalline than sponge coke and provides even greater hardness and strength, which makes it more suitable for products such as electrodes for metallurgy manufacturing.

However, the various sulfur and nitrogen impurities within raw Delayed coke would render the material useless for such high-value applications. Their presence causes structural deficiencies and other undesirable qualities in the end carbon product. Sulfur impurities are typically the higher concentration of the two and are a function of the sulfur content of the crude oil from which the coke is derived. The process of calcining generally does not heat the coke to high enough temperatures to remove sulfur. This invention provides a process that utilizes high temperature and chemical reactivity to desulfurize delayed coke to produce a high-value coke suitable for use in carbon products.

A second type of coke making process, referred to a Fluid coking, generally produces coke of unacceptable quality for electrode and steel production without special treatment. Fluid coking converts heavy crude tars into a coke that has a relatively amorphous crystalline structure. This amorphous structure lacks the required hardness, strength, bonding and handling characteristics required in the manufacture of electrodes and other high-value carbon products. Accordingly, fluid coke is considered a "low-value" carbon fuel and is typically burned as solid fuels in boilers similar to coal. Still, some fluid coke is used in production of carbon products usually by grinding and blending with Delayed coke to minimize the adverse impacts on end product quality. This invention provides a process that substantially desulfurizes fluid coke to produce a more useful carbon product.

2. Description of the Prior Art

The primary process parameters for most all petroleum coke desulfurization processes are: 1) temperature, 2) residence time, 3) particle size of the material being treated, 4) contact with a chemical reagent, and 5) pressure. Most desulfurizing methods disclosed in the prior art involve elevated temperatures (<1,300° C.) at set residence times (1-24 hours) or involve contacting the coke with chemically reactive agents (hydrogen gas, liquid acids, sulfur gases, etc.). Desulfurization methods that contact coke with an inert gas are generally categorized with the temperature/time processes and have limited sulfur removal efficiency.

Many prior publications and patents describe efforts to use a hot, inert flue gas to desulfurize coke. The Oil and Gas Journal, Jan. 22, 1979, pg. 64-68, describes a thermal process whereby the coke is heated to a set temperature over a three to nine hour period. One drawback of thermal-time processes is that high sulfur removal requires high temperatures, which often results in loss of coke yield and product density.

U.S. Pat. No. 4,160,814 discloses a thermal process with data showing extensive desulfurization with nitrogen as the inert medium but there is no suggestion that other gases may be used.

U.S. Pat. No. 3,009,781 describes a two-stage process for treatment of fluid coke in which the first stage involves electrothermic production of carbon disulfide from the coke and a second stage involved passing a stream of gas through the bed. This patent states that gases such as nitrogen, carbon monoxide, hydrogen, mixtures of carbon monoxide, hydrogen and nitrogen, and hydrogen sulfide are especially effective desulfurizing agents at 1,500° C. This patent further states that sulfur removal by these gases (excluding nitrogen) is enhanced if the coke is pre-treated with an oxidizing gas and an alkali metal. One problem with this patent is that the inclusion of nitrogen, an inert gas, in a list with other gases known to chemically react with sulfur suggest the inventors could not distinguish thermal desulfurization effects from chemical desulfurization effects.

U.S. Pat. No. 4,011,303 discloses a process whereby a gas containing sulfur is used to chemically remove the sulfur from the coke, without reference to pre-heating. The reagent gas is elemental sulfur vapor diluted with nitrogen whereby the elemental sulfur combines with carbon-sulfur groups in the coke. However, it also reacts with carbon in the coke, contributing to a loss of carbon yield. The sulfur removal efficiency of this process is generally low.

In U.S. Pat. No. 4,406,872, Delayed coke is desulfurized by contact with an active sulfur-bearing gas at a temperature high enough to produce a reaction between the sulfur in the coke and the active sulfur in the gas, and then holding the coke in contact with the gas at said high temperature for approximately one hour. Two alternatives are presented, one involving a modified second step having contact with an inert gas and a second involving lowering the temperature during the second step to maintain the reaction between the sulfur-bearing gas and the coke.

In U.S. Pat. No. 4,511,362, carbonaceous materials are desulfurized using an up-flow fluidized bed reactor where chlorine gas at a temperature up to 300° C. is injected until at least 1 percent by weight of chlorine is added to the material. Next, the chlorine gas is exchanged with an inert gas at a temperature of at least 300° C. to dechlorinate the material below 1 percent by weight.

In U.S. Pat. No. 3,130,133, substantial sulfur removal is accomplished by subjecting the treating material sized to 200 mesh to a hydrogen gas stream flowing through and that reacts with the sulfur to form gaseous Hydrogen Sulfide. This patent establishes that significant sulfur removal can be achieved by reaction with hydrogen gas at a relatively low temperatures (94% impurity removal at 750° C.). However, this patent also states that such high removal rates at such low temperatures require that the coke be pre-ground and screened to 200 mesh presumably to increase the coke surface area where the hydrogen-sulfur reactions take place.

SUMMARY OF THE INVENTION

The present invention provides a process for desulfurizing delayed coke by: (a) generating a stream of hot Carbon Monoxide (CO) gas in a pressurized external Combustor by partially oxidizing a first solid carbon fuel, (b) controlling the temperature of the CO gas exiting the external combustor by adjusting the addition rates of O2 and CO2 gases, or O2 and air gases, being fed to the combustor, (c) injecting the hot CO gas into a pressurized close-loop system containing a charge of a second solid carbon fuel, (d) reacting sulfur in the second solid carbon fuel with the hot CO gas to form Carbonyl Sulfide (COS) and Carbon Disulfide (CS2), (e) separating the residual CO from the second solid carbon fuel and removing the reacted impurities in an external process, and (f) returning a substantial portion of the cleaned CO containing stream back to the second solid carbon fuel for continued reactions with sulfur.

This invention presents an integrated process that the operator can apply to a range of solid carbon materials of varying sulfur content. Higher or lower reactor temperatures are controlled by varying O2 rates or O2 plus CO2 rates to the external Combustor. Higher or lower system pressures are controlled by adjusting the purge rate of system gases. This present invention accomplishes these objectives by way of contacting the solid carbon fuel with a hot, reactive gas (CO) under pressure. The hot reactive CO gas is generated under pressure in a specially-design combustor that burns a solid carbon fuel under sub-stoichiometric conditions. The pressurized hot CO containing gas is then transferred to a specially-designed desulfurizer process containing the solid carbon fuel to be treated. As the hot CO moves through the treated solid fuel, a combined mechanism of thermal and chemical attack removes the impurities. This combined removal mechanism allows the operator to achieve the desired level of impurity removal from the solid fuel while minimizing heating costs and density reduction.

It is the objective of this invention to use CO containing gas as both the chemical agent of desulfurization and the source of heat input to the system. Moreover, the hot CO gas is generated externally by partial oxidation of a lower-value carbon source, such as calcined shot coke. By using low-value carbon to desulfurize high-value carbon in the reactor loop, significantly better process economics can be realized.

It is still a further objective of this invention to enhance reactivity and operability by operating the desulfurizing system under pressures greater than 10 psig. Operating pressure will be selected based on pressure drop through the column and the desired production rate. Higher system pressures allow for the reagent CO to penetrate deeper into material being treated, increasing heat transfer rates and sulfur removal rates while minimizing the extent of pre-grinding or separating the material being treated. Also, since the external combustor is also under pressure, there is no need to compress the hot reagent gas for injection into the pressurized reactor loop.

It is still a further objective of this invention to purify and recycle unreacted CO in an external process so that overall CO generation is minimized. The only CO required to be generated is 1) to replace what is lost to chemical reaction with sulfur, 2) what is lost to purge to control the system pressure, and 3) what is required to keep the reactor loop at its temperature set point(s).

It is still a further objective of this invention to perform the preheating, desulfurizing, and product cooling operations in a single vertical column with the material being treated in continuous communication.

It is still a further objective of this invention to improve efficiency of the external hot CO generator by redirecting a portion of the generated hot gas through the solid fuel feeding the Combustor for purposes of desulfurizing and/or preheating the solid fuel. Highly pure CO can be generated in the Combustor using only O2 and CO2 when sulfur and certain other impurities have been removed prior to burning the solid carbon fuel. Alternately, simply partial preheating of the supply column can assure that the hot zone remains at the top of the Combustor while allowing a larger portion of the generated gas to go directly to the users of the hot gas stream.

Although the Combustor described in this embodiment is described in combination with a closed-loop system for desulfurizing petroleum coke, it is to be understood that the Combustor can act as a generator of CO for other processes for which CO is a required feed stream. The Combustor is also capable of producing CO in varying concentrations by adjustment of inert gas flows there into. When ambient air is used as a reactant in the Combustor, both the cost of hot CO generated and the concentration are reduced. By addition of dry ambient air only, hot gas temperature can range from under 2,300° F. to over 2,700° F. Hot gas temperatures can also be varied by changing the amount of hot gas directed up the Combustor's coke supply column. The limit to the hot gas temperature results when the supply column is saturated with heat. How much of the gas is required to saturate the bed depends on the composition of the gas. With pure CO, just over 20% of the gas generated will saturate the supply column. With dry air when using JANAF Tables of Thermodynamic data and adiabatic heating, the maximum temperature with full saturation is over 2,700° F. and requires about 27% of the gas. With no flow to the supply column the temperature is less than 2,300° F. due to the ambient inlet coke from the supply column. The use of dry air will produce a stream of low CO2 content and CO content of about 35%. Higher temperatures may be achieved by adding concentrated O2 to the combustor with ambient air. The removal of dilutant gases from ambient air feeding the Combustor also increases the CO concentration in the exit gas. At approximately 3,300° F., the extra oxygen is about equal to one fourth of the O2 in air with full saturation of the supply column with heat.

Such streams as described above can serve a useful purpose when used in the calcining of green coke, the removal of volatile impurities from coal and in subsequent desulfurization of solid carbon fuels. Pure CO streams generated from CO2 and O2 may not prove to be sufficiently superior to air/oxygen streams when applied to the desulfurization. Therefore, the selection of feed gases for the Combustor will recognize the intended use for the generated gas. Ultimate economics of the process will dictate. In some processes the sequestering of CO2 might become of economic importance.

DETAILED DESCRIPTION OF THE FIGURES

Figure 1:
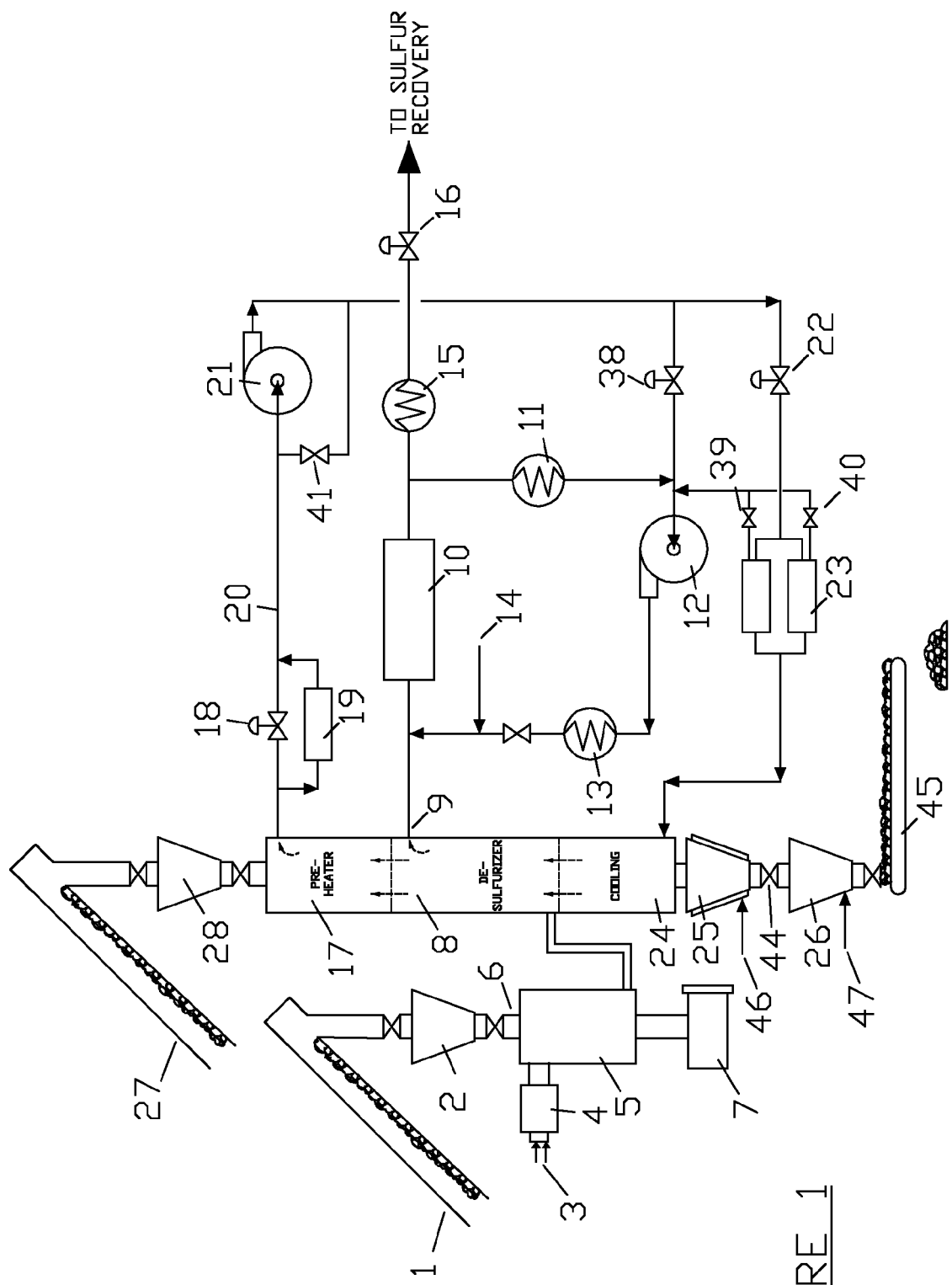
FIG. 1 shows a schematic of the desulfurizing process comprised of a close-loop reactor containing the material being treated coupled to an external combustor where the reagent CO gases and system heat are generated.

FIG. 1 shows a process schematic of the present invention. An elevator 1 containing a low-value, calcined fuel coke brings fuel to a hopper 2. Coke from the hopper 2 is supplied to the combustor 5 through a supply column 6. The fuel coke fills the Combustor 5 and debris bin at 7. A start-up burner 3 operates with CO gas and Oxygen. The mixed and ignited gases flow into oxidizer at 4. Hot gas from the Oxidizer passes into the combustor where the fuel coke is heated and ignited. All oxygen in the gases is consumed in the Combustor. Part of the hot combustor gas flows back up the supply column 6 at a controlled rate and is vented to a collection header that feeds a standard sulfur recovery process. The hot gases vented back to the supply column 6 pre-heat coke fuel entering the combustor to replace burned coke. Preheating the fuel coke assures that the combustion zone remains at the top of the Combustor 5. As coke flows into the Combustor, the coke stored in the Hopper 2 replaces the fuel coke in the supply column. Coke in the supply column 6 can become heat saturated by a small portion of the combustion gas (about 20%). If an even smaller percentage of the generated gas is directed to the supply column, more heat will flow to the desulfurizer 8. When the objective is to generate the highest purity CO for CO sales, a higher rate of back flow up the supply column 6 would be desired to remove sulfur from the incoming fuel. However, such action may not be necessary for a desulfurizer operation since the presence of some sulfur in the gases exiting the combustor would not be critical.

In continued reference to FIG. 1, hot gas flow is flow directed up the desulfurizer 8 and provides both the reactant gas and the make-up heat to overcome overall system heat losses. Heat losses are from heat flow through the walls of the desulfurizer system and from gas purges within the system. The hot combustor gas mixes with recycle gas from blower 21 coming up from the cooling section 24. The rate of recycle gas is determined by batch size and reacting time. For example, for a 5,000 lb quantity in the reacting section 8, 25 minutes cooling time required the charge in the cooling section 24, and 1,650° C. reaction temperature, about 4,000 SCFM of recycle gas and 1,000 SCFM of Combustor gas would be required. Hot gases exit the Desulfurizer at 9 and are composed of unreacted gases and extracted impurities. A catalyst bed 10 is used to convert the CS2 and COS in the stream into H2S. Before conversion, the gases must be cooled to a favorable temperature. A side stream of cooling gas is motivated by the Blower 12. Cooling gas passes through two heat exchangers 11 and 13. Exchanger design will be by a qualified heat exchanger design company and based on performance specifications provided. Sizing for the Blower 12 will be as required to cool the catalyst bed inlet stream to about 900° F. Actual temperature will be selected by the Catalyst manufacturer for optimum conversion. The exit gas cooling Blower 12 flow will also depend on the temperature of gas exiting at 9 from the Desulfurizer 8 where a temperature of 3000° F. or higher might exist. The Cooling Blower 12 will have variable flow capability.

In continued reference to FIG. 1, an analyzer will be placed in the catalyst exit stream to measure the COS and H2S. Water or steam at 14 is added to the gas stream and rate adjusted to assure optimum conversion within the catalyst bed 10. After conversion to H2S the gas exits the system through the Heat Exchanger 15 and the Back Pressure Control Valve at 16. Whether or not flow from the cooling loop recycled through to the Blower at Point 12 includes the Catalyst Bed at 10 will be an option for the Catalyst Vendor. A portion of the gas exiting the Desulfurizer 8 continues up through the Preheater 17. Heat is deposited into the Preheater coke from this hot gas to prepare it for entry into the Desulfurizer 8. Timing of the hot zone movement through the Preheater 17 is adjusted to coincide with the movement of the hot zone through the Cooling section 24 below the Desulfurizer. Differences in heat capacity between the Preheater section 17 and the Cooling section 24 can cause a different hot zone velocity. A way to adjust for differences in hot zone velocity is incorporated into the Process. The correction recognizes that the Preheater 17 contains impurities that are not present in the Cooling section 24 indicating that more flow is needed in the Preheater. That need is overcome by allowing some Recycle flow to pass through the Flow Control Valve 38 to the suction of the (Recycle) Cooling Blower Suction 12. Any flow passing through the valve 38 will automatically be eliminated from the flow at 9 due to the physical nature of closed loop systems.

When the gas exits from the Preheater 17 into the recycle line at 20 it is normally cool having deposited stream heat into the coke bed. Some hot gas will reach the top of the column near the end of a batch cycle. A heat sink bed 19 will absorb the extra heat. Flow to the small bed is initiated by closing the control valve at 18 that bypasses the bed. When cool gas is again present in the stream at 20, the bed is purged by throttling the control valve 18 to force a portion of the flow to pass through the bed. Control of the amount diverted will be based on the exit temperature of the blended gas. The bypass valve 18 will be an automatic Temperature Control Valve. In continuous operating mode, the hot zone will be controlled within the Preheater 17 and only relatively cool gas will be allowed to exit. When gas temperature begins to rise at the top of the Preheater 17 almost all the coke will be heated. Exit temperature must be allowed to rise beyond the allowed recycle line temperature. The heat sink bed 19 will absorb the excess heat. Heating of the Preheater will be virtually complete when the coke bed at 19 is saturated with heat. Adjustment in flow will assure that heating in the Preheater 17 coincides with cooling time in the Cooling section 24. Temperatures in the Desulfurizer 8 and the supply column 6 will be monitored and gas flows adjusted to meet desired operating conditions. Temperatures in the top of the Preheater and Cooling sections will signal when the coke is desulfurized and ready to be moved to the section below.

Flow from the recycle blower 21 will be rerouted to the blower suction by opening the valve 41. With gas flow stopped, the Coke is dropped from the lower Cooling section 25 and into a lower staging hopper 26. Incoming cold coke falls from the upper staging hopper 28 to replace the displaced coke in the Preheater 17. The lower staging hopper 26 is sized to hold the contents of one column. Hot reagent gas flow Combustor 5 continues during the drop. When the drop is completed the lower staging hopper 26 can be isolated from the Desulfurizer by closing an interposed valve. The lower staging hopper 26 is now under system pressure and can be vented to the Sulfur Recovery process. This hopper can also be purged with Nitrogen in preparation for emptying the hopper onto the discharge conveyor 45.

When refilling, the upper staging hopper 28 is isolated from the Preheater 17 by an interposed valve and the hopper can be vented to Sulfur Recovery or other device such as a flare. The upper staging hopper 28 is filled from the elevating conveyor through an interposed valve. The upper staging hopper 28 can be pressurized by gas from the Combustor diverted through the Supply Column 6. Once the upper staging hopper 28 is filled and pressurized the bottom valve can be reopened allowing the coke to again communicate with the Preheater 17. Refilling the Combustor upper staging hopper 2 is accomplished using an analogous procedure.

Once the hot coke from the Desulfurizer section falls into the Cooling section, the Recycle Blower 21 is again directed to the Cooling section 24. Flow is initiated by closing bypass valve 41 and opening the recycle flow control valve 22. In route to the Cooling section the Recycle flow passes through the activated carbon beds 23. The activated carbon beds 23 remove impurities in the recycle line to prevent recontamination of the treated material in the cooling section 24. The Cooling section hopper 25 contains cooling coils for air or water 46 that assures that the cooled coke is ready for exposure to air as it is released from the lower staging hopper 26.

Under Batch Mode the Product Unloading Hopper 26 will be vented and purged before being emptied on to the Conveyer 45. The Product Unloading Hopper 26 will not be fully pressurized when accepting a new charge from the lower Cooling section 25. Continued operation of the combustor 5 during transfer to the Product Unloading Hopper 26 will maintain pressure in the Desulfurizer system.

The present invention can be operated in batch, semi-batch, or continuous modes depending on the selection of valves and system program control. Nitrogen gas purge in the various staging hoppers can prevent the escape of CO contaminated gas with flowing coke. Of major importance in the success of Continuous Mode Operation will be pressure drop of the gas as it passes through the coke column. Interference in the movement of coke down the bed will occur if the pressure drop begins to approach the weight of the bed. Highest pressure drop will occur inside the Desulfurizer section 8 where both the Recycle and Combustor streams are flowing. To those skilled in the art, it is readily apparent that the size of equipment used to carry out this invention can vary depending on the desired processing rate of material being treated and the system operating pressure.

The present invention can be started by charging the inlet hoppers with solid fuel and the material being treated. After the system is closed by shutting the various system valves, gas flow through the Combustor enters through the burner nozzle at 3. A vent line and back-pressure control valve within the system begins venting gas flow out of the system when the selected system pressure is reached. Recycle flow is established by activating Recycle Blower 21. Next, hot gas flow is established by starting the burner 4. The temperature of the gas exiting the combustor 5 is controlled by adjusting gas flow to the burner. While system temperatures are low there are no contaminants in the vent gas and it can be released through flare. For safety, the system temperature is generally kept below 500° F. until the O2 content in the purge gas is below 2%. As temperature begins to rise in the system the Cooling Blower 12 will be started. System heating times on start-up will generally be dependent on the recommendations of refractory material suppliers. When the desired system temperature is reached, Recycle blower 21 is stopped and the Recycle Cooling Blower Bypass Valve 41 will be opened. Treated material from the lower cooling section 25 is dropped into lower staging hopper 26. When the drop is complete, valve 44 closes. Recycle flow through blower 21 is re-established, Cooling Blower Bypass valve 41 is closed and the system begins to again heat up to the desired peak temperature and another material drop cycle occurs. It is readily apparent to those skilled in the art that other common utility systems, such as N2 pressure, vent lines, flare headers, cooling water, cooling air would be integrated into the present invention to facilitate operation.

Figure 2:
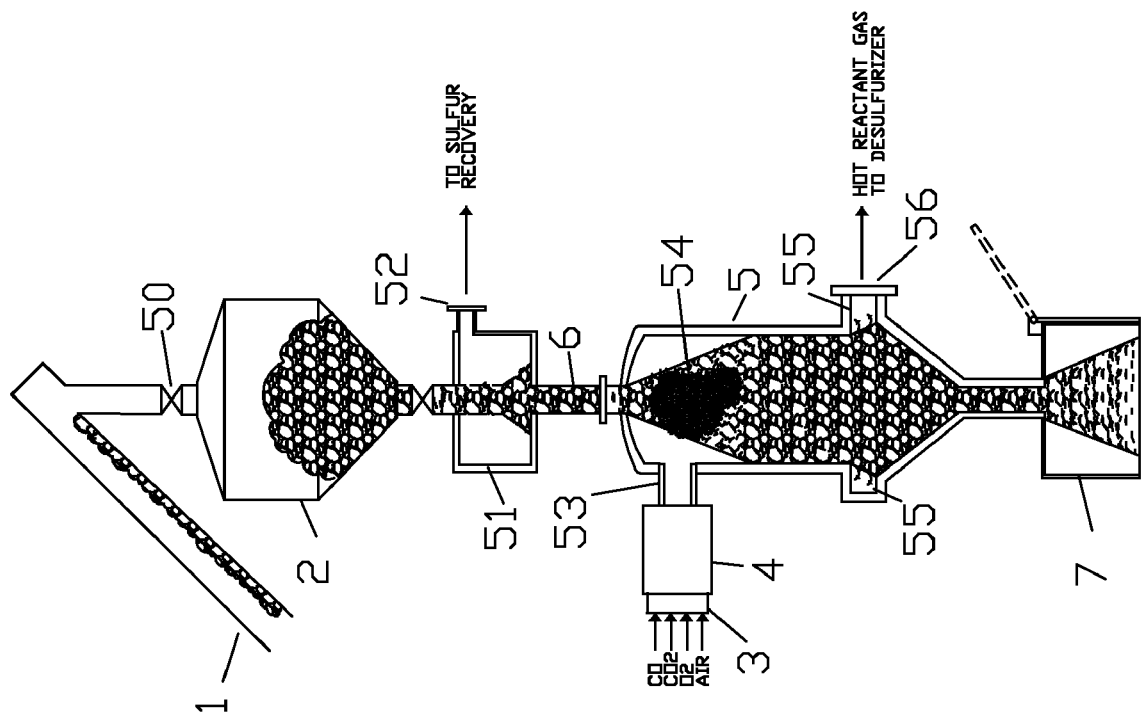
FIG. 2 shows a detailed schematic of the external combustor where the hot CO gases are generated.

FIG. 2 shows further detail of the external CO generator system. In the preferred embodiment of the invention, the CO generator burns lower-grade petroleum coke, such as Shot Coke. However, other types of coke or charcoal could be used. The CO generator generates a range of gas temperatures, typically ranging from 800° F. (minimum coke combustion temperature) up to 3,300° F. and beyond. Gases generated will be devoid of oxygen and will contain mostly CO or CO and nitrogen that can approach the thermodynamic equilibrium concentration. There is a natural equilibrium for CO that corresponds to an equilibrium constant that increases with temperature over a wide range. The composition of the product gases from the combustion of any selected gas will influence the final concentration of CO. Higher pressures and the presence of inert gases, such as nitrogen, will reduce CO content. However, increasing temperature even a small amount will raise the CO concentration by reducing any CO2 present. Use of concentrated O2 instead of compressed air will also increase CO concentration.

In continued reference to FIG. 2, Compressed Air, CO, CO2 and O2 are connected to a burner 3. Combustion of CO and oxygen in the Burner will heat the feed gases. Combustion will be completed in the Oxidizer 4. A temperature sensor near the end of the Oxidizer will detect the combusted gas mixture temperature and control the flow of CO as needed to satisfy a selected temperature set-point. Hot gas will enter the open space in the Combustor 4 where no coke is present due to the angle of repose. Hot gas will heat the coke to the ignition temperature. In the beginning of hot gas flow the gas temperature and blend will be set to maintain a selected low temperature in the coke below the combustion temperature. The Combustor must be heated somewhat slowly at a rate recommended by the Refractory Manufacturer. Eventually the gas temperature and coke temperature will reach combustion temperature of coke, about 800° F. Actual coke bed temperature will remain under the control of the gas blend. Increasing feed gas oxygen content will result in increasing coke bed temperature. The Burner 1 will remain in operation until the coke bed is fully heated. When coke temperature is high enough to burn the gas blend on contact the burner operation becomes optional.

The bed temperature is controlled by varying the mass flow of O2 to the combustor 4. Since temperatures could be elevated to levels higher than the capability of the refractory lining, accurate mass flow regulation and temperature measurement are employed with a high temperature safety shutdown system.

If low-grade coke is used as a feed to the Combustor, impurities could be removed by passing a portion of the gas generated in the Combustor 4 upward through the Supply Column 6. Coke falls through the Supply Column 6 as the coke pile is depleted by gasification in the combustor. This upward gas flow both preheats and with higher temperature gas can desulfurizes the incoming coke prior to entering the combustor 4. When the highest purity CO is desired, more than 20% of the combustor's generated gas may be required to flow back up the Supply Column 6. The reaction of Coke with O2 and CO2 at a suitable mole ratio will result in very pure CO. Once formed, CO will not revert to CO2 as it cools unless a catalyst is present. Iron in particular is a catalyst for the reversion. If cooled in the presence of a catalyst the reversion of two CO molecules to one CO2 and one carbon molecule will result in the precipitation of coke or smoke. Because the presence of CO is desired in the desulfurizing application, the walls of the Combustor below the Hot Zone 54 are lined with graphite pipe or carbon refractory that will not catalyze the Reversion Reaction.

Most of the generated hot gas at the Hot Zone 54 proceeds down through the coke bed and exits through the sides of the bed at 55. Sides of the bed at 55 completely encircle the bed and exist at the angle of repose for the carbon. The lower portion of the Combustor is filled with larger size carbon particles screened to about −½ inch and plus ¼ inch. Hot gases exit the combustor at 56 and are available to feed to a desulfurizer process, as presented herein, or other process for which hot gas from the CO generator may be useful.

Figure 3:
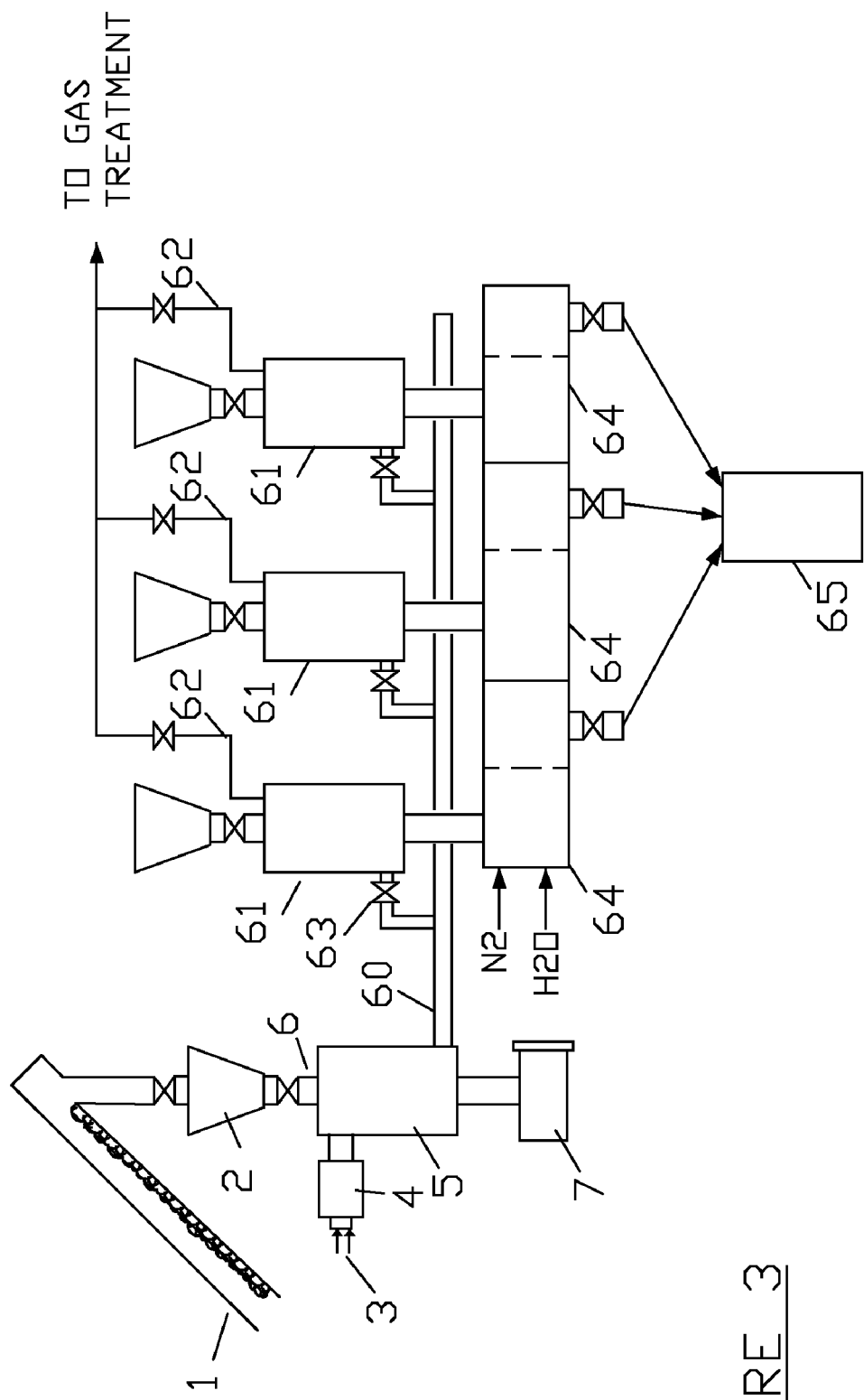
FIG. 3 shows a schematic detail of an alternate embodiment of the process whereby multiple reactors are connected to a single external combustor.

FIG. 3 shows a schematic of an alternate use of the present invention where multiple treating vessels are connected to one Combustor. This configuration is particularly useful for treating carbonaceous fuels, such as coal. Raw coal can be both calcined and desulfurized in separate steps in one vessel using hot CO gas from the combustor 5. Combustor gas is directed through a refractory lined header 60 into one or more treatment units 61. Prior to adding hot gas from the combustor, the refractory-lined Units have been filled with pre-ground raw carbonaceous fuel. When the Units are cold the heating is started slowly and all units are heated simultaneously. As the contents within each treating unit are heated by the incoming hot gases from the combustor, steam and volatile matter that is vaporized exits the system along with the cooled combustor gases through the vent line at 62. Treatment will typically be in stages and the collected vent gases directed to different treating processes as vent gas temperature leaving each treating unit rises. After the initial calcining of the treatment unit contents, high temperature gas from the combustor 5 can be used to convert coal to charcoal and to desulfurize the coal. As would be apparent to one skilled in the art, the particular treatment steps will be selected based on the desired changes to the material in the treatment vessels. As gas heating progresses through multiple treating units, the inlet valve 63 will cool. Once cooled, the valve can be safely closed thus allowing the contents of the unit to be discharged to a quench kiln. When the treatment cycle is complete, the treatment unit contents are dropped into a quench bin 64 pre-purged with nitrogen to prevent ignition of the hot carbon. Water is pumped into each quench bin to cool the contents with the generated steam vented, collected and treated. The newly quenched carbon replaces carbon that moves along to the product hopper 65 at a rate controlled by the quench kiln. Transfer completion is recognized by the emptying of the supply hopper and filling of hopper 65.

What is claimed for Letters Patent is:

1. A method of generating a hot stream of carbon monoxide gas comprised of

Supplying a low-value, calcined fuel coke to a first hopper,

Feeding the fuel coke through an inlet conduit from the first hopper into a combustor vessel having and upper end with a start-up burner attached and a lower end attached to a debris bin, Igniting the start-up burner attached to an oxidizer chamber attached to the combustor and flowing combustion gases from the burner through the oxidizer and into the upper end of the combustor vessel, Contacting the calcined fuel coke in the upper end of the combustor with the hot gases from the oxidizer such that the fuel coke is heated and ignited, Combusting the fuel coke until all of the oxygen is consumed in the combustor, Feeding additional fuel coke from the first hopper to the combustor to replace combusted coke in the combustor, Removing uncombusted fuel coke and solid impurities from the debris bin, and Extracting hot gases from the lower end of the combustion vessel above where uncombusted fuel coke and solid impurities and ash are removed to the debris bin.

2. A method of removing impurities from solid carbonaceous fuels comprised of

Supplying a low-value, calcined fuel coke to a first hopper,

Supplying a calcined or heat-treated carbonaceous fuel to an external reactor vessel, Feeding the fuel coke from the first hopper into a combustor vessel having and upper end with a start-up burner attached and a lower end attached to a debris bin, Igniting a start-up burner attached to an oxidizer chamber attached to the combustor and flowing combustion gases from the burner through the oxidizer and into the top of the upper end combustor vessel, Contacting the calcined fuel coke in the combustor with the hot gases from the oxidizer such that the fuel coke is heated and ignited, Combusting the fuel coke until all of the oxygen is consumed in the combustor, Feeding additional fuel coke from the first hopper to the upper end of the combustor to replace combusted coke in the combustor, Removing uncombusted fuel coke and solid impurities from the debris bin, Extracting the oxygen-starved hot gas generated in the combustor from the bottom of the combustor vessel and flowing into the external reactor vessel, heating the calcined or heat-treated fuel by direct contact and reacting impurities within said fuel with carbon monoxide at elevated temperatures.

3. The method of claim 2 further comprising the steps of

Removing the hot gas and reacted impurities from the reactor vessel for recycling, Cooling and compressing this recycle gas, Flowing a rate of the compressed recycle gas equal to the rate of combustor gas entering the reactor column plus impurities from carbonaceous fuel to a vent source, Flowing the compressed recycle gas through activated carbon to remove impurities, Flowing the cleaned recycle gas back to the reactor vessel through a cooling vessel containing treated fuel in communication with fuel within the fuel being treated in the reactor vessel, Mixing the reheated recycle gas with the hot gas from the combustor to form a hot gas mixture for treating the carbonaceous fuel in the reactor vessel.

4. The method of claim 3 where the flow rate of recycle gas ranges from 1 to 5 times that of the hot combustor gas.

5. The method of claim 3 further comprising the steps of:
Extracting a portion of the hot gas and reacted impurities from the reactor vessel,
Cooling the hot extraction gas mixture with a portion of the cooled compressed recycle gas,
Flowing the cooled extraction gas mixture to an external recovery and treating process and removing the impurities from the extraction gas.

6. The method of claim 5 where the cooled extraction gas is mixed with and H2O stream and passed first through a catalyst bed to convert impurities Carbon Disulfide (CS2) and Carbonyl Sulfide (COS) to Hydrogen Sulfide (H2S) before transfer to an external recovery and treating process.

7. The method of claim 3 wherein the hot combustor gases and reacted impurities exiting the reactor vessel pass through a preheating vessel containing untreated high-value carbonaceous fuel in communication with the fuel in the reactor vessel such that the untreated fuel is heated prior to entering the reactor vessel to be treated.

8. The method of claim 5 wherein a controlled stream of the cooled compressed recycle gas is mixed into the extraction gas to control the temperature of extraction gas.

9. The method of claim 3 comprising the further steps of
Stopping the flow of recycle gas to the cooling vessel,
Flowing the treated carbonaceous fuel from the cooling vessel into an isolated treated product vessel,
Flowing the preheated fuel in the preheater vessel to the reactor vessel,
Flowing the treated fuel in the reactor vessel to the cooling vessel,
Flowing fresh untreated fuel into the preheater vessel, and
Reestablishing flow of the recycle gas to the cooling vessel.

10. The method of claim 1 further comprising a start-up burner that operates on Carbon Monoxide and Oxygen gases.

11. The method of claim 1 wherein part of the hot combustor gases flows back up through the inlet conduit at a controlled rate and vented to a collection header that feeds a standard sulfur recovery process, thereby preheating the coke fuel entering the combustor to replace burned coke and to remove sulfur and other impurities from the incoming fuel.

12. A method for generating carbon monoxide gas from a carbonaceous solid fuel comprised of:
Supplying the carbonaceous fuel to a staging hopper through a first block valve,
Flowing the carbonaceous fuel into a separation hopper through a second block valve,
Flowing the carbonaceous fuel into a combustor vessel having and upper end with a start-up burner attached and a lower end attached to a debris removal chamber,
Igniting the start-up burner attached to the combustor vessel so that combustion gases contact the carbonaceous fuel within the combustor igniting the carbonaceous fuel creating a zone of ignited carbonaceous fuel,
Flowing the combustion gases fed to and generated by the combustion of the carbonaceous fuel downward through the carbonaceous fuel pile and extracting these gases at a point below the zone of ignited carbonaceous fuel,
Adjusting the oxygen flow to the burner and oxidizer vessel so that extracted gas is fully depleted of Oxygen,
Extracting ungasified carbonaceous fuel and solid impurities from the bottom of the combustor vessel,
Flowing additional carbonaceous fuel into the combustor vessel to replace a quantity extracted from the bottom of the combustor vessel.

13. The method of claim 12 further including controlling the temperature of the gas stream exiting the oxidizer by adjusting the flow rate of CO to the burner.

14. The method of claim 12 further including controlling the temperature of the extracted gases by adjusting the flow and the ratio of CO2 and O2 to the combustor.

15. The method of claim 12 further including controlling the temperature and concentration of CO in the extracted gases by flowing O2 and/or air and to the combustor.

16. The method of claim 12 further including flowing of hot gases generated in the combustion vessel upward through the conduit connecting the separation hopper and the combustor vessel and extracting gases from the separation hopper thereby preheating the incoming carbonaceous fuel to the combuster and removing impurities prior to the fuel entering the combustor.

17. The method of claim 16 wherein the quantity of gas generated in the combustor and flowed back to the separation hopper is at least 20% of the mass of the hot gases generated in the combustor.

18. The method of claim 16 wherein the quantity of gas generated in the combustor and flowed back to the separation hopper is sufficient to preheat the carbonaceous fuel to a spontaneous combustion temperature.

19. A method of treating one or more vessels containing a carbonaceous fuel using hot gases containing carbon monoxide comprised of the following:
Supplying a low-value, calcined fuel coke to a first hopper,
Feeding the fuel coke to a combustor vessel having and upper end with a start-up burner attached and a lower end attached to a debris removal chamber,
Igniting the start-up burner using a fuel gas stream and an excess of an oxidant stream attached to an oxidizer chamber attached to the combustor and flowing the combustion gases from the burner through the oxidizer and into the top of the combustor vessel,
Contacting the calcined fuel coke in the combustor with the hot gases from the oxidizer such that the fuel coke is heated and ignited,
Combusting the fuel coke until all of the excess oxygen is consumed in the combustor,
Feeding additional fuel coke from the first hopper to the combustor to replace combusted coke in the combustor,
Removing uncombusted fuel coke and solid impurities from the debris bin,
Extracting hot gases from the lower end of the combustion vessel above where uncombusted fuel coke and solid impurities are removed to the debris bin,
Flowing the hot gases into the bottom of one or more external parallel vessels containing a carbonaceous fuel to be treated,
Flowing the hot gases up through the carbonaceous fuel thereby heating the fuel over time to dehydrate, vaporize volatiles, and remove undesired impurities from the carbonaceous fuel,
Venting the gases flowing through the external vessels to a flare or other external treating and recovery process,
Ceasing flow of the hot gases from the combustor to one or more parallel treating vessels once the vent gas temperature reaches a desired level,
Discharging the treated carbonaceous fuel by gravity into a quench kiln, Pumping water into a quench kiln to cool the hot treated carbonaceous fuel to a temperature between water saturation temperature and the spontaneous combustion temperature, and Extracting and dewatering the dry quenched carbonaceous fuel from the quench kiln.

* * * * *